W. WALKER.

Plaiting-Device.

No. 6,704. Reissued Oct. 19, 1875.

Witnesses.

J. V. Rockwell

A Tucker

Inventor.

William Walker

N. PETERS, PHOTO-LITHOGRAPHER, WASHINGTON, D. C.

W. WALKER.

Plaiting-Device.

No. 6,704.

Reissued Oct. 19, 1875.

Witnesses.

J. V. Rockwell

A Tucker

Inventor.

William Walker

N. PETERS, PHOTO-LITHOGRAPHER, WASHINGTON, D. C.

UNITED STATES PATENT OFFICE.

WILLIAM WALKER, OF BROOKLYN, NEW YORK, ASSIGNOR TO GEORGE H. WOOSTER.

IMPROVEMENT IN PLAITING DEVICES.

Specification forming part of Letters Patent No. 108,855, dated November 1, 1870; reissue No. 6,704, dated October 19, 1875; application filed August 30, 1875.

*To all whom it may concern:*

Be it known that I, WILLIAM WALKER, of Brooklyn, in the county of Kings and State of New York, have invented certain new and useful Improvements in Plaiting Devices, of which the following is a full, clear, and exact description, reference being had to the accompanying drawing forming part of this specification, and in which—

Figure 1:
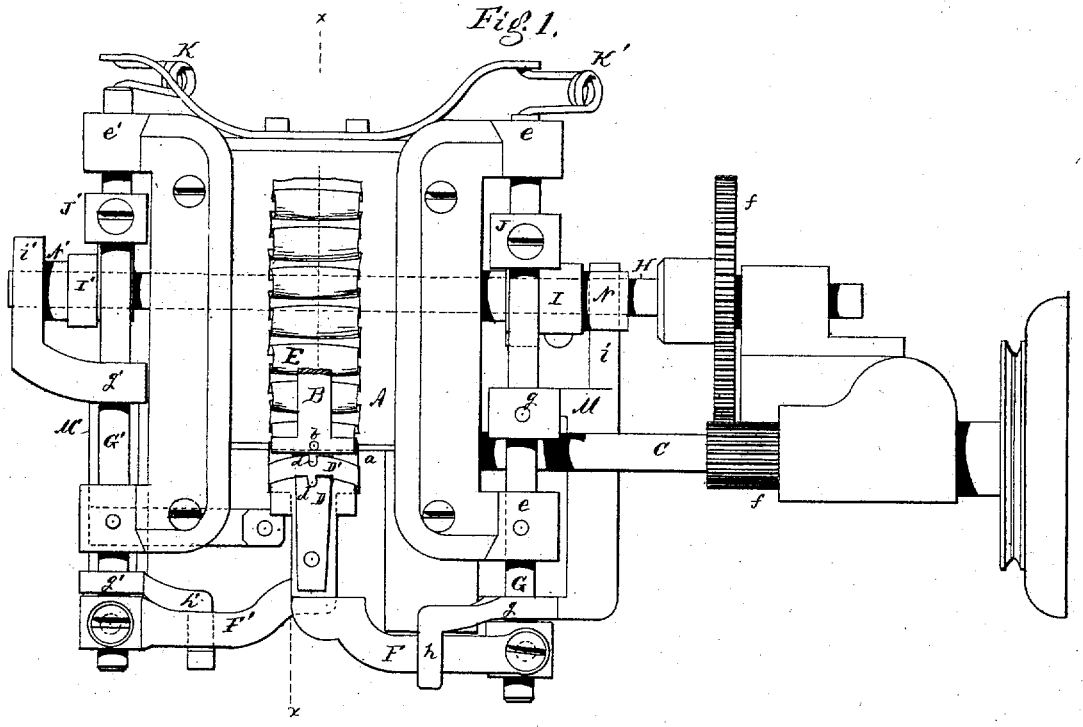
Figure 2:
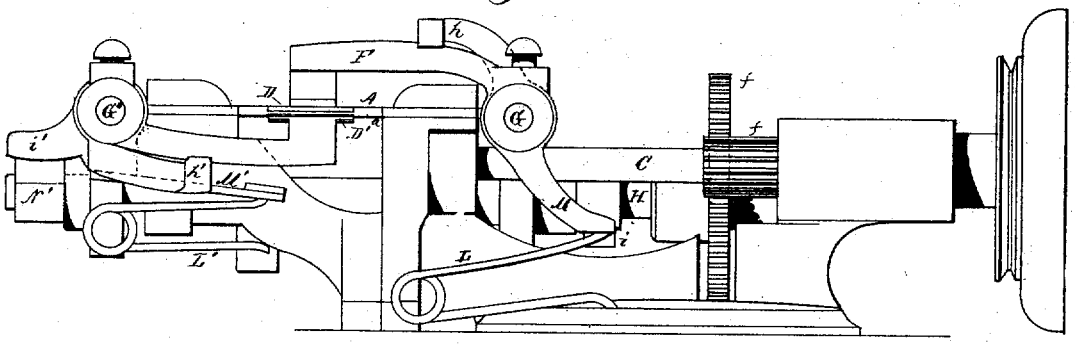
Figure 3:
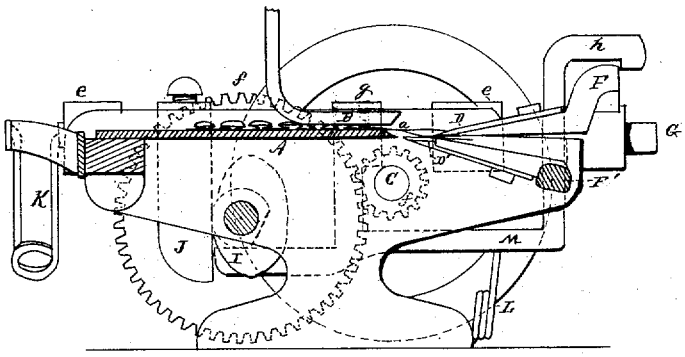
Figure 4:
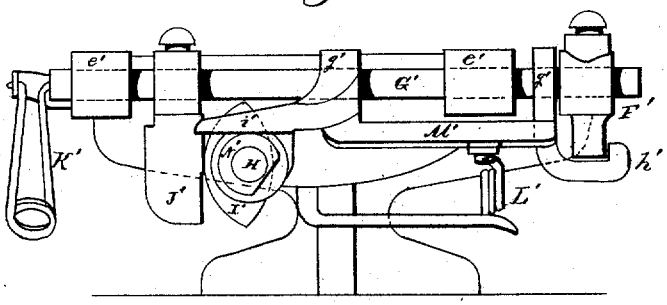

Figure 1 represents a plan of a sewing-machine in part, with a plaiting device, constructed according to my invention, applied thereto; Fig. 2, a front view of the same; Fig. 3, a vertical section taken as indicated by the line *x x* in Fig. 1; and Fig. 4, a side elevation thereof.

Similar letters of reference indicate corresponding parts.

This invention, so far as certain features of it are concerned, is applicable either as an attachment to a sewing-machine or as a separate device for plaiting ribbon, tape, and other ware or goods, and is not restricted to the production of any one particular form of plait, which may either be simple or box, the invention consisting in the use of either a single plaiting-blade or two blades, operating substantially as described.

The arrangement of two independent separate plaiting-knives to work one against the other, to enable the production of box-plaiting, constitutes, irrespective of the mode or means by which motion is communicated to the knives, one portion of this invention.

The invention also embraces a certain arrangement of parts and mode of operating a plaiting blade or blades, including combinations of devices, as hereinafter described.

The invention also consists in the combination of a plaiting device and a sewing-machine (whether said device be made up of a single or two plaiting-blades) with or by means of gearing or driving mechanism which will so time the plaiting and sewing that several stitches can be made in each plait, instead of a single stitch, as has heretofore been the case.

The accompanying drawing represents the several features of the invention.

A represents the table of any suitable sewing-machine, which, when two plaiters are used, as hereinbefore described, may be recessed or cut away, as at *a*, to provide for the action in concert of said plaiters. B is the presser-foot or holder of the machine, and *b* the aperture for the passage of the needle. C is the main or looper shaft. D D′ are the plaiting blades or knives, which are here shown as operating upon a strip or ribbon, E, passing between them, to produce box-plaiting, the plaits of which are secured by a single line of stitching, *c*. The notches in the knives D D′ allow them to work close up to the needle, and the blades have similar, but reverse, actions given them to fold the material as it lies or is fed in between them.

When operating to form box-plaiting, the operation is first by the one knife to give the material a turn or fold under, and then by the other knife to make a turn or fold over, the material having a timely feed given it relatively to the plaiting action of the knives, to produce a succession of such folds, as will be readily understood by those acquainted with the action of single plaiters having their bearing on the sewing table or bed, and which first act with a spring-pressure on or over the material, to produce the fold against the presser-foot when down, then release from pressure and retire, and subsequently are pressed down and again move forward to produce a succeeding fold or plait. Said knives, toward the completion of their forward stroke, move in concert with the general feed and with each other, carrying the plait under the toe of the presser-foot, and then are released from pressure and retire at the same time that the action of the general feed allows the foot to press on and hold the plait.

Such is the general action of the combined plaiters D and D′, successively, as regards each other, and bearing one against the other, with the material in between them instead of on the bed, the arrangement of devices and combinations of parts for communicating to the plaiters, or either of them, their necessary movements differ essentially from those heretofore employed.

To give to the plaiters D and D′ their respective motions or actions relatively to each other and to the material in between them, for the purpose of producing a box-plait, each plaiter is operated by a like combination of devices acting alternately and in concert, as hereinafter described, to give to the plaiters a griping motion, as produced by spring-pressure, a forward feed, a releasing action, and a backward stroke.

The devices for accomplishing these motions are as follows: Each plaiter D or D′ is secured to an arm, F or F′, crooked, so as to give it a cross or right-angled direction to the line of feed, which insures free access to the plaiter or plaiters, for the introduction and handling of the goods, and arms F F′ are connected with shafts or carriers G G′, arranged to work in bearings *e e′* connected with the machine. These shafts or carriers G G′, which lie parallel to the feed and out of the way of it and parallel with the cloth-plate, give to the plaiting blades or knives their necessary forward and backward and rising and falling motions. These motions of the plaiters might be taken direct from the main or looper shaft C of the sewing-machine; but, to secure each plait by means of two or any greater number of stitches, motion for the purpose is taken from a secondary shaft, H, geared to the main shaft C, as by gears *f f*, to run at a reduced velocity to the main shaft.

The forward motions of the plaiters, alternately in reverse directions, are effected by properly disposed cams I I′ on the shaft H, made to act against the toes J J′ on the shafts G G′, while their backward strokes are secured by springs K K′ bearing against the back ends of said shafts. To cause the plaiters to grasp or hold the goods while either plaiter is moving forward, springs L L′ are permitted to act alternately on arms M or M′, having their bearings at *g g′* on the shafts G G′, and formed with arms *h h′*, which, when the springs L L′ are in action, bear against the arms F F′, to induce gripe of either plaiter on the goods. To release either plaiter, when making its back stroke, from such spring-pressure, either arm M or M′ is rocked or acted upon in a direction reverse to that of the springs L L′, so as to release its arm *h* or *h′* from pressure against the plaiter-arm F or F′ by means of cams N N′ appropriately shaped and arranged on the revolving shaft H, to act alternately against legs *i i′* of the arms M M′. The plaiters D D′ have here been described as operating upon the goods, to produce a single plait on opposite sides of the material alternately; but, if desired, the one plaiter may be made to produce two folds or plaits in succession upon the same side of the strip, and then the other plaiter be made to do the same upon the opposite side thereof, each plaiter working one against the other, as hereinbefore described, only having two strokes or succeeding actions, each in the place of one. The blade and its carrier reciprocate in a plane parallel with the direction of the feed.

I claim—

1. In a plaiting device, the combination of two independently-acting blades, one adapted to seize and operate on one, and the other on the opposite side of, and to move the fabric to be plaited.

2. The combination of two independent blades, adapted to operate on opposite sides of the fabric to be plaited, with mechanism adapted to operate the blades alternately, substantially as described.

3. The combination, with two blades arranged to grasp opposite sides of the fabric, of mechanism adapted to close or shut one blade toward the other, to move the blades forward simultaneously, and carry with them the material, and to release from pressure one blade from the other on returning, substantially as described.

4. The combination of a blade, arranged on one side of the fabric to be folded, with a blade arranged in opposition to it on the other side, one blade being adapted to engage the fabric resting against and to move it over the surface of the other blade, substantially as described.

5. The combination, with two independent reciprocating blades, arranged one below the other, and adapted to grasp and release the fabric, of a feeding mechanism to move the folded material, substantially as described.

6. The combination of two independent acting blades, adapted to operate against opposite sides of the fabric, with a presser or holder, substantially as described.

7. The combination of two independent acting blades arranged on opposite sides of the fabric to be folded, with a sewing mechanism to secure the folds by stitches, substantially as described.

8. The combination of two independently-acting blades, arranged to engage the material between them substantially as described, with sewing mechanism, adapted to form two or more stitches to each fold or plait, essentially as set forth.

9. The combination, with two independent blades, adapted to engage the upper and under side of the material to be folded, with mechanism adapted to operate the blades, as follows, viz: to move toward and grasp the material to carry the material forward, to release the blades from pressure on the material, and to move backward over the material for a new fold or gather.

10. The combination of the rocking frame M, the carrier G, the cams I and N, the springs K and L, and the arm F, of the plaiter D, substantially as specified.

11. The blades D D′, combined with the carriers G G′, arranged and reciprocating at opposite sides of the line of stitching, substantially as described.

12. In a plaiting mechanism two independent blades arranged on opposite sides of the fabric, and adapted to alternately engage and move the fabric resting against a surface opposed to the acting blade, to form plaits.

13. In a plaiting mechanism two independently-acting blades, one acting on an opposing surface above its acting edge, and the other acting on an opposing surface below its acting edge, in combination with a feeding mechanism.

14. The combination, with two independent blades attached to a sewing-machine, of a secondary shaft, operated by the main shaft of the machine, and made to run at a slower velocity than said secondary shaft, essentially as and for the purpose set forth.

WILLIAM WALKER.

Witnesses:

J. V. ROCKWELL,

A. TUCKER.